July 25, 1967  G. F. SEAGREAVES ET AL  3,332,255
PLASTIC UNIVERSAL JOINT MEANS
Filed Aug. 30, 1965

INVENTORS
George F. Seagreaves
BY Arthur H. Winyard

Albert H. Reuther
Their Attorney

United States Patent Office 3,332,255
Patented July 25, 1967

3,332,255
PLASTIC UNIVERSAL JOINT MEANS
George F. Seagreaves, Warren, and Arthur H. Winyard, Cortland, Ohio, assignors to General Motors Corporation, Detroit, Mich., a corporation of Delaware
Filed Aug. 30, 1965, Ser. No. 483,693
1 Claim. (Cl. 64—11)

ABSTRACT OF THE DISCLOSURE

This invention relates to a one piece universal joint of molded plastic material consisting of two axially spaced opposite end portions, each of which includes an axial hole for accommodating respective external shafts, and a plurality of strut members extending between the end portions. The strut members are angularly disposed between the end portions in such a manner that each is joined at one end only with one end of an adjacent strut member and one of the end portions in a substantially V-shaped juncture and at the other end only with one end of the other adjacent strut member and the other end portion in a substantially V-shaped juncture.

---

This invention relates to a new and improved universal joint, and more particularly, to a unitary plastic molded universal joint configuration.

Problems of assembly of mating parts of universal joints results in limitations of function as well as unnecessary wear resulting in need for repair. Expense of making multiple parts is also considerable. Accordingly, an object of the present invention is to provide a one-piece plastic injection molded universal joint at minimum cost yet dependable as a coupling between similar as well as differing shafts.

A further object of this invention is to provide a plastic molded universal joint for use in low torque dynamic torsional loads and shaft bending movements having misalignment capability and high dependability due to all plastic configuration having only predetermined integral strut interconnection between opposite shaft ends suitably recessed in axially opposite directions.

Another object of this invention is to provide an all-plastic universal joint including opposite end portions interconnected by at least four strut portions which define substantially V-shaped junctures collectively for flexible torsional dynamic capability.

Further objects and advantages of the present invention will be apparent from the following description, reference being had to the accompanying drawings wherein preferred embodiments of the present invention are clearly shown.

Figure 1:
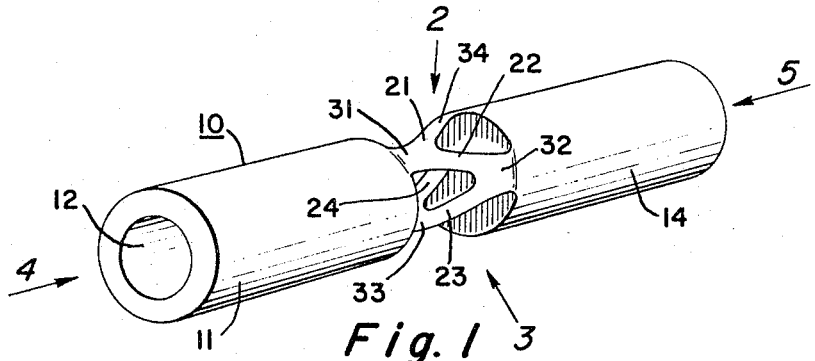
FIGURE 1 is a perspective view of a universal joint having features in accordance with the present invention.
Figure 2:
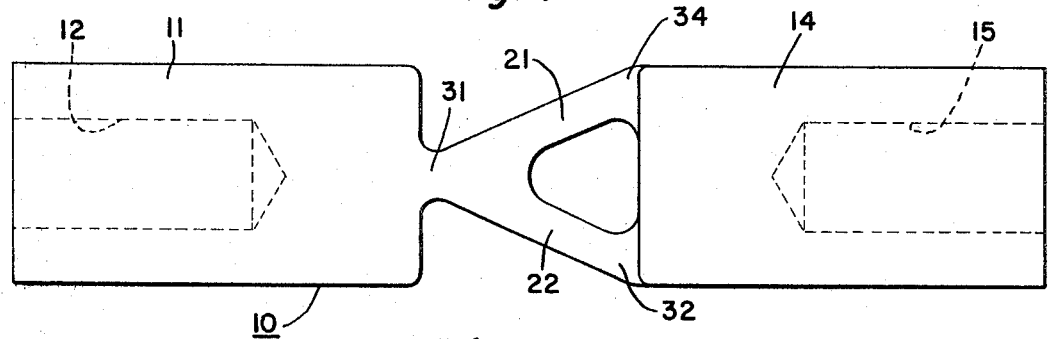
FIGURE 2 is a plan view taken in direction of arrow 2 in FIGURE 1.
Figure 3:
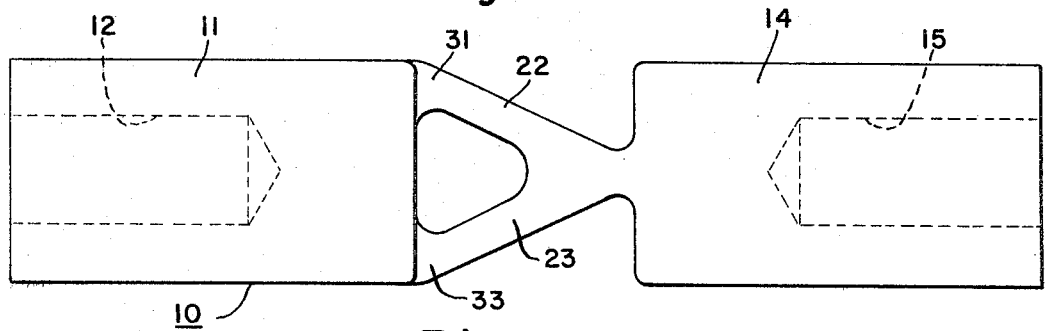
FIGURE 3 is a side view taken in direction of arrow 3 in FIGURE 1.
Figure 4:
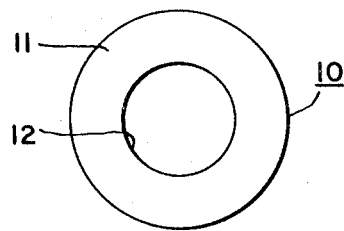
FIGURE 4 is an end view taken in direction of arrow 4 in FIGURE 1.
Figure 5:
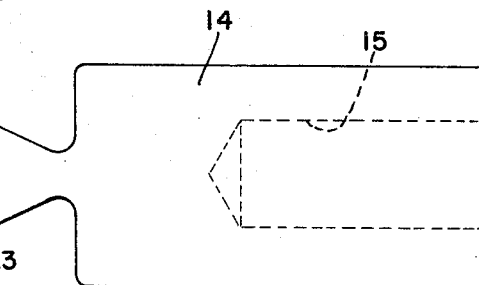
FIGURE 5 is an end view taken in direction of arrow 5 in FIGURE 1.

FIGURE 1 shows a plastic universal joint means generally indicated by numeral 10 including a first end portion 11 having an axial opening 12 as well as an opposite end portion 14 having an axial opening 15. These opposite end portions 11 and 14 are suitably injection molded and made of plastic material. Such plastic material for example is nylon or polyamide as well as acetal resin and other tough though synthetic and resilient plastic compositions.

The universal joint means 10 includes a plurality of struts 21, 22, 23 and 24 which are angularly disposed and integrally joined between the end portions. At least four of such struts are provided to bridge recessing or space otherwise left open between the end portions 11 and 14. Collectively the struts form substantially V-shaped junctures which are integrally connected at locations 31, 32, 33 and 34 of which most are apparent in the perspective view of FIGURE 1. These V-shaped junctures formed collectively by the struts of plastic material in a one-piece injection molded universal joint means permit flexibility and resilience regardless of predetermined misalignment between opposite though axially spaced shafts. The shafts per se are not shown though it is to be understood that they fit into the opposite axial openings 12 and 15 subject to press fit and adhesive bonding by use of compatible materials. For example, epoxy resin cementitious materials are usable to bond such shafts to the opposite end portions 11 and 14. It is also to be understood that suitable clamping means as well as transverse pins are usable.

It is to be understood that preferably the plastic molded universal joint is made from polypropylene material. A universal joint having features in accordance with the present invention is usable as a connection between a control knob and a separately mounted switch. Electrical energization effected by switch operation can then be accomplished regardless of control knob positioning in a range up to about 35° angle to one side of normal access shared by the knob and/or shaft to an adjoining shaft for which resilient coupling is established.

It is to be understood that the plastic universal joint means having features in accordance with the present invention is usuable for interconnection between shafts of similar as well as differing diameter. The opposite axial openings are shown having identical diameters through it is to be understood that differing diameters are possible and also might result from press fitting the end portion onto a particular shaft resiliently engaged in a tight fit. Another example of use for the universal joint means in accordance with the present invention is for a coupling between an actuator and linkage mechanism suitably geared as a window lift operator that raises and lower glass or translucent panels on vehicle doors.

The unitary plastic molded universal joint regardless of size and dimensions has many advantages. It provides an inexpensive universal joint having misalignment capability and high dependability. Total cost is low and yet the universal joint made only of plastic provides satisfactory results for use in low torque dynamic torsional loads and shaft bending movements. It is to be understood that torsional dynamic capabilities of the plastic universal joint means can be altered by change of angulation of the struts. Also various diameter shafts are usable with this universal joint by changing the diameters of axial holes and/or due to press fit of the opposite end portions onto shafts of slightly differing diameters.

While the embodiments of the present invention as herein disclosed constitute preferred forms, it is to be understood that other forms might be adopted.

What is claimed is as follows:

A universal joint comprising, a one piece unit of molded plastic material having axially spaced opposite end portions, each of which includes an axial hole for accommodating respective external shafts, and a plurality of strut members extending between said end portions, each one of said strut members being angularly disposed in such a manner that each is joined at one end only with one end of an adjacent said strut member and one of said end portions in a substantially V-shaped juncture and at the other end only with one end of the other adjacent said strut member and the other of said end portions in a substantially V-shaped juncture.

References Cited

UNITED STATES PATENTS

| 2,860,495 | 11/1958 | Stark | 64—11 |
| 3,177,684 | 4/1965 | Bossler | 64—2 |
| 3,224,224 | 12/1965 | Kudriavelz | 64—11 |

FRED C. MATTERN, JR., *Primary Examiner.*

HALL C. COE, *Examiner.*